Nov. 13, 1956  J. A. DONATO  2,770,367
OIL FILTER SEAL CONSTRUCTION
Filed May 5, 1953

INVENTOR.
JOHN A. DONATO
BY Woodling and Krost
attys

2,770,367
OIL FILTER SEAL CONSTRUCTION

John A. Donato, Brecksville, Ohio, assignor, by mesne assignments, to Erie Meter Systems, Inc., a corporation of Pennsylvania Application May 5, 1953, Serial No. 353,152

1 Claim. (Cl. 210—148)

This invention relates to a repackable filter cartridge for use within a case or housing in the process of elimination of sludge and such foreign matter from the oil used in lubrication of engines, and relates particularly to internal combustion engine filters, the filter cartridge comprising an improved relationship of parts to permit the filtering material contained therein to be replaced with a fresh supply.

The advantage of this invention is that the filtering material, such as ordinary "waste," is removable from the perforated cartridge shell, and the cartridge shell as a container for the "waste" is usable indefinitely and is repackable with clean "waste" when necessary, and may be provided with exchangeable oil sealing means when necessary.

A further advantage is that the "waste" may be readily examined to ascertain whether proper filtering is taking place without having to destroy the cartridge, as is the case with conventional oil filtering cartridges.

A further object of this invention is to provide a housing and replaceable sealing member constructed in such manner that the replaceable sealing member is prevented from falling into the center tube of the filter when inserting the cartridge shell over the permanent shaft of the housing.

Another object of the invention is to prevent the removable seal from dropping into the center tube when changing the seals.

This invention relates to the construction shown and described in United States Patent No. 2,559,133 and the reissue therefor No. 23,604. The specific improvement provided by this invention relates to the shaft sealing construction employed with the improved filler shown and described in these patents.

Other objects and a fuller understanding of the invention may be had by referring to the following description and claim, taken in conjunction with the accompanying drawing, in which:

Figure 1:
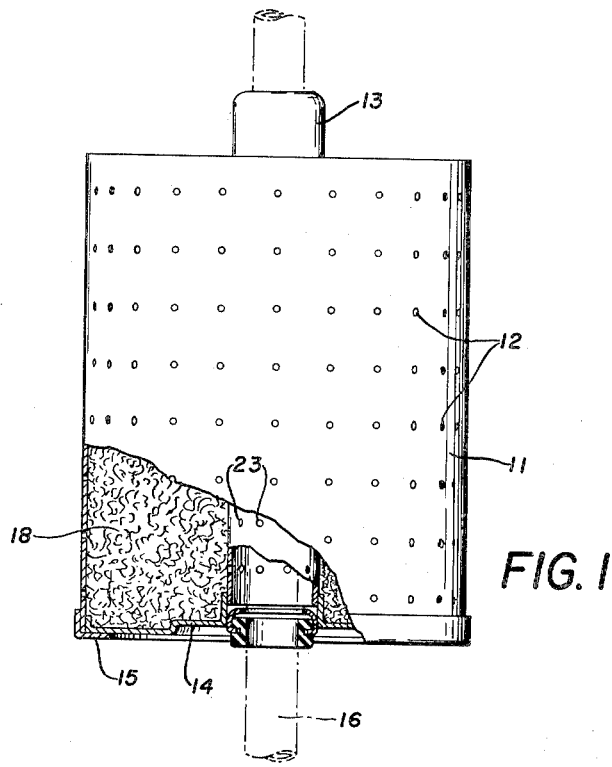
Figure 1 is an elevational view of one type of filter construction with which the present invention may be employed, the shell of the cartridge being broken away to reveal the internal construction thereof, and to reveal the location of the improved seal of this invention.
Figure 2:
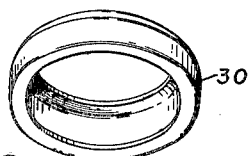
Figure 2 is a perspective view of the housing of the improved seal construction of this invention.
Figure 3:
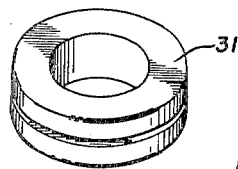
Figure 3 is a perspective view of the removable seal insert construction of this invention.

In the drawing the numeral 11 refers to a circular cartridge or cartridge shell for use with oil filters. The cartridge shell 11 is provided with perforations 12 through the wall thereof.

A tube 13 is centrally disposed within the cartridge shell 11, and is also perforated as illustrated by reference character 23 throughout its length within the cartridge. The tube 13 is axially parallel with the cartridge and projects above the top of same. A circular push-plate 14 is affixed to the bottom end of the tube 13, such as by means of spot welding, and fits closely within the bottom of the cartridge shell 11. The plate 14 is loosely slidable within the cartridge shell 11 from bottom to top. A circular flange 15 acts as a stop to hold this plate 14 within the cartridge. Other modifications of the cartridge shell and bottom plate construction may include such improvements as a domed top and a bottom member fitting the exterior diameter of the shell and locked thereto. Such construction is shown and illustrated in a co-pending application.

Permanently located sealing devices are generally employed with filtering cartridges, but the reusable type of cartridge shell as shown in the drawing is intended to last the lifetime of the engine with which it is employed, or longer. The resilient seal material usually must be replaced frequently in order to continue to block the passage of oil and produce an effective filtering action.

Attempts have often been made in the filtering industry to provide replaceable seals and, in fact, such devices are provided with replaceable seals. It has been found, however, that the seal structures commonly provided are defective from a practical standpoint because they can become dislodged during installation of the repacked cartridge into the housing, or can drop down into the tube 13 during installation.

The housing generally employed for oil filter cartridges has a vertically extending bolt or supporting conduit, indicated in the drawing by the dot-dash lines referred to by reference character 16. The type of housing referred to is very well known and need not be illustrated. It consists merely of an outside shell with a cap held on top of the housing by means of a screw engaged in the top of the bolt 16. The bolt 16 is hollowed to conduct fluid. In other words, the bolt is actually a tube. Somewhere along the intermediate part of the bolt 16 there is provided at least one aperture through which oil flows during the filtering process. Oil is either pumped through the bolt 16 under pressure and exhaust out of the aperture, or is pumped through an entrance in the housing and is collected through the aperture and drained back to the motor through the bolt 16. In either event, it is necessary to provide seal means preventing the free passage of oil out of the ends of the tube 13 between the tube and the bolt. That is the reason for the sealing devices. These sealing devices do not necessarily have to be absolutely fluid tight because some small amount of leakage will not be detrimental. The object is to pass the bulk of the oil through the waste material 18. By continually filtering a portion of the oil, the oil is kept to a satisfactorily low concentration of contamination until the waste is thoroughly saturated with such contamination.

As illustrated, there are two sealing device structures in the illustrated embodiment of a filter. Reference to one of the sealing devices is sufficient for the purpose of setting forth the improvement of this invention. The seal at the bottom of the tube 13 will be employed for this purpose. The sealing structure comprises an anchor member 30 and an annular seal packing 31.

Figure 4:
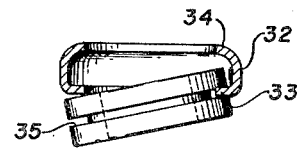
Figure 4 is a sectional view through the housing with the removable packing member in full side view as it appears in the position assumed at the start of the insert operation to install the seal in the housing.

The anchor member in its preferred form, as illustrated, comprises an annular ring having a substantially U shaped cross-sectional configuration, is best illustrated in Figure 4 of the drawing. The cross-sectional configuration shows a true ring portion 32, a laterally disposed flange portion 33, and a safety stop flange 34.

Unless the exceptionally desirable advantage of the safety stop flange 34 is fully understood, the merits of this invention will not be apparent. The ring portion 32 is secured at the entrance to the tube 13 in the illustrated embodiment of the invention but may be placed within the tube if desired. The seals must be placed to block off the passage of oil flow and force the oil to go through the perforations 23 in the packing material within the cartridge shell 11. The flange portion 33 is a desirable method of holding the sealing packing 31 properly positioned with respect to the tube 13 and together with the provision of a peripheral channel 35 in the packing 31 produces good anchorage and sealing interconnection between the anchor member 30 and the packing 31.

However, the filled cartridge seal must be placed over the bolt 16 and dropped down into the housing of the filter. Mechanics work rapidly, and it is the frequent experience of such mechanics that the packing member of conventional filters are accidentally caught on the top of the bolt 16 and dislodged from their mountings and pushed down into the interior of the tube 13. When such an accident occurs with the conventional throwaway type filter, it is usually cheaper to throw away the filter, even though it has never been used, rather than to spend the time of the mechanic to grapple for the packing and get it back into proper position. With the permanent type cartridge seal as illustrated in the drawing, the packing would have to be removed because of the cost of the cartridge. In either event, a considerable economic loss occurs, and the disposition of the installer also suffers.

It should be readily apparent that the provision of the safety stop flange 34 is exceptionally desirable. With this invention there has never been known to be an occasion where the packing has been accidentally pushed down into the tube 13. There has never been a delay in installing a new packing, or a delay because of accidental dislodgement of the packing catching on the bolt during installation of the cartridge into the housing.

Those who have actually serviced oil filters will readily appreciate the exceptional advantage of this construction, whereas the improvement may be minimized if filter constructions are only known on a theoretic basis.

The carriage shell 11 is filled with oil filtering material indicated by the reference character 18 such as ordinary "waste," surrounding the tube 13. To eject the "waste" the bottom plate 14 is pushed upwardly and slidably through the cartridge shell. When repacked with clean "waste" the cartridge is placed in an oil filled conventional oil filter case, and the oil passes through the perforations 12 filtering through the "waste," thence passing through the apertures 23 into the tube 13 and out through the hollow bolt 16 by way of the aperture 17 therein for return to the lubricating system. This oil passaging process may be reversed in direction from the inside of the bolt 16 to and through the cartridge wall.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

In a perforated cylindrical type oil filter cartridge containing filtering material, an outer cartridge filter wall, a central perforated tube within the outer cartridge filter wall and having an open end portion to fit around a supporting bolt, the combination of seal means for providing a seal between the supporting bolt and the end portion of the central perforated tube, said seal means comprising an anchor member and a seal member mounted within the anchor member, said anchor member comprising an annular ring having first and second spaced in-turned flange portions defining substantially a U-shaped cross section, said flange portions respectively having an opening to surround said supporting bolt, said anchor member being mounted at the open end portion of the tube with the first flange portion constituting an entrance for the seal member and with the second flange portion constituting a safety stop to prevent the seal member from entering the perforated tube, said seal member having an outer peripheral channel and an inner surface adapted to snugly embrace said supporting bolt, said first in-turned flange portion engaging the outer peripheral channel of said seal member and supporting said seal member within said anchor member, the size of the opening in the second flange portion being less than the size of the seal member and the distance that the second flange portion is spaced from the first flange portion being less than the thickness of the seal member whereby the second flange portion prevents the seal member from entering the perforated tube, said anchor member and said seal member supporting said filter cartridge against lateral movement but permitting axial movement of the filter cartridge with respect to said supporting bolt.

References Cited in the file of this patent
UNITED STATES PATENTS

| | | |
|---|---|---|
| 2,192,305 | Gilman | Mar. 5, 1940 |
| 2,487,146 | Lasky | Nov. 8, 1949 |
| 2,559,133 | Schultz | July 3, 1951 |
| 2,601,404 | Lasky | June 24, 1952 |
| 2,614,694 | Sather | Oct. 21, 1952 |